United States Patent

Menke

[11] 4,273,410
[45] Jun. 16, 1981

[54] POLYGONAL CYLINDER FOR USE IN OPTICAL PICTURE SCANNING SYSTEMS

[75] Inventor: Josef F. Menke, Glücksburg, Fed. Rep. of Germany

[73] Assignee: Electro-Optik GmbH & Co. K.G., Glücksburg, Fed. Rep. of Germany

[21] Appl. No.: 56,405

[22] Filed: Jul. 10, 1979

[51] Int. Cl.$^3$ .............................................. G02B 27/17
[52] U.S. Cl. ..................... 350/6.2; 250/334; 250/347
[58] Field of Search .................. 350/6.1, 6.2, 6.4, 179, 350/190, 285; 250/334, 347; 358/205; 352/113, 116, 179, 120

[56] References Cited

U.S. PATENT DOCUMENTS

| 2,288,079 | 6/1942 | Fitz | 352/116 |
| 2,972,280 | 2/1961 | Kudar | 358/205 X |
| 3,539,251 | 11/1970 | Husted et al. | 352/113 |

FOREIGN PATENT DOCUMENTS 581628  8/1959  Canada .................................. 352/119

Primary Examiner—F. L. Evans
Attorney, Agent, or Firm—Gilbert L. Wells

[57] ABSTRACT

An optical system for scanning thermographic pictures comprises a rotating polygonal cylinder for line scanning in one coordinate direction. The polygonal cylinder is subdivided into an inner stationary solid cylindrical portion and a ring surrounding the cylindrical portion. The ring is on its outer side provided with the polygonal faces and rotates around the cylindrical portion. The cylindrical portion has a single curved face extending substantially perpendicular to the optical axis. The inner wall of the ring and the curved face define between them a cylindrical air lens element. The shape of the curved face is computed in accordance with the image distortions of the optical system so that the air lens compensates for the image distortions.

2 Claims, 2 Drawing Figures

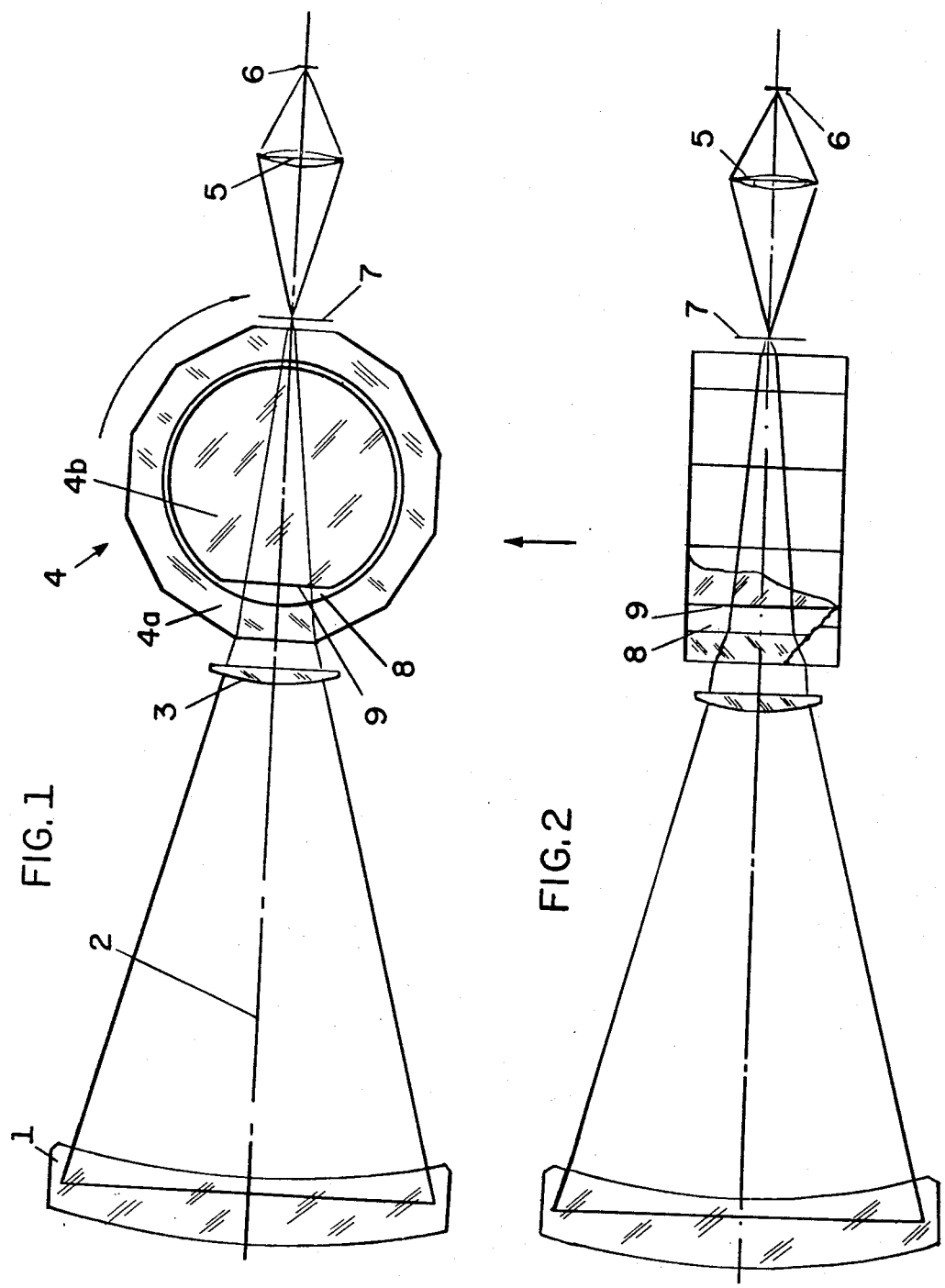

POLYGONAL CYLINDER FOR USE IN OPTICAL PICTURE SCANNING SYSTEMS

BACKGROUND OF THE INVENTION

The present invention relates to optical picture scanning devices, particularly to devices which include a polygonal cylinder for line scanning.

Devices of this type are already known in the art and are disclosed, for example, in U.S. Pat. No. 3,977,760 and 4,002,830. However, it is also known that the optical system of such a device causes image distortions, such as astigmatism, curvature of the image plane and parallel shift of the central beam, which may well render the image blurred and out of focus. Efforts have therefore been made for eliminating these image distortions, for example, by inserting into the beam path a correcting lens computed in accordance with the optical data of the polygonal cylinder and the objective lens.

Inserting such a corrective lens can, however, only eliminate the curvature of the image plane and the parallel shift of the central beam while the astigmatism is rather increased by such a corrective lens. The astigmatism can only be corrected by corrective steps at the polygonal cylinder itself, as is well known to those skilled in the art.

Undertaking corrective steps at the cylinder itself would normally result in curved faces of the polygonal cylinder which so far are always plane parallel surfaces. Such curved faces, which would have a certain refracting lens effect, are extremely difficult to manufacture and would entail high costs and a high number of rejections.

It is therefore an object of the invention to provide simple means for correcting the astigmatism in optical picture scanning devices.

SUMMARY OF THE INVENTION

According to the present invention the above stated object is attained by subdividing the polygonal cylinder into a central cylindrical stationary portion and an outer rotating ring having on its outside the plane parallel cylinder faces and by providing at the stationary cylindrical portion a curved face extending substantially perpendicular to the optical axis.

The height (or depth) of the curved face and the shape of the face are decisive for the correcting effect and depend on the grade of the astigmatism to be corrected.

By subdividing the polygonal cylinder in the above described manner an air lens element is provided which has the shape of a cylinder lens and remains stationary with regard to the optical axis while the rotating ring causes the line scanning in the known way.

It is a particular advantage of the invention that the surface of the curved face has only to be manufactured once with every cylinder. The surface can therefore easily and at comparatively low cost be finished to high precision; and this one face will be effective for all plane parallel surface pairs of the cylinder as they rotate through the optical axis. It will be of no influence whether a four-sided or eight-sided etc. cylinder is applied.

BRIEF DESCRIPTION OF THE DRAWING

The invention will be more readily comprehended from the following description when taken in conjunction with the appending drawings, wherein:

FIG. 1 shows schematically an optical picture scanning system, and

FIG. 2 is a view of the drawing of FIG. 1 in the direction of arrow A in FIG. 1.

DESCRIPTION OF THE PREFERRED EMBODIMENT

In FIG. 1 the objective lens is designated by the numeral 1. In the beam path behind lens 1 there are arranged along the optical axis 2 a correcting lens 3 followed by the polygonal cylinder 4. Behind the cylinder 4 is located a transformation lens 5 and a detector 6.

The detector 6 may actually be a set of detectors arranged one above the other in a direction normal to the plane of drawing of FIG. 1. The transformation lens images the detectors 6 in the focal plane 7 of the optical system which is located close to the exit side of the cylinder.

It is to be understood that the elements so far mentioned are conventional in devices of the general type. Further, FIG. 1 shows only schematically the picture-taking part of the device. Those skilled in the art will readily understand that the detectors 6 are electrically linked, for example, to light emitting diodes the brightness of which is controlled by the electrical signals generated by the detectors in accordance with the intensity of the beams impinging thereon. The light beams emitted by the diodes are assembled to form a visible picture by scanning means that are almost identical to those in the picture-taking part. These elements, however, are being omitted because they are known per se.

Still further, it will be understood that optical picture scanning systems of this nature are primarily used to utilize thermoradiation for generating pictures within the visible light range. The material of which the optical elements in the picture-taking part of the device are made is therefore pimarily Germanium. However the invention is also applicable when the scanning device works with its picture-taking part in the visible light range, in which event the objective lens and the polygonal prism are made of glass.

The invention proper rests with the polygon cylinder 4. The cylinder is subdivided into a central portion 4b which is cylindrical and stationary, and into an outer ring 4a which rotates around the central portion 4b. On its outside the ring 4a is provided with the polygon surfaces which are plane and parallel in pairs.

On the side facing the objective 1 the central portion 4b is provided with a curved face 9. Thereby an air lens element 8 is formed between the ring 4b and the portion 4b which has, naturally, the form of a cylinder lens. The height (or depth) of the curved face 9 depends on the grade of the astigmatism to be corrected and is, thus, different from system to system.

The shape of the face 9 is primarily curved. However, depending on the distortion to be corrected it may also be spherically or aspherically curved.

What is claimed is:

1. In an optical system having an objective lens generating an optical axis, a correcting lens, a polygonal cylinder lens, a transformation lens, and detecting means spaced consecutively and respectively along said optical axis, the improvement comprising:

said polygonal cylinder lens having a second axis substantially perpendicular to said optical axis and comprising an inner stationary cylindrical portion located along said second axis and having a single curved face perpendicular to said optical axis, a hollow polygonal cylinder ring mounted for rotation about said inner portion and said second axis and having an outer surface provided with polygon surfaces which are plane and parallel in pairs and an inner surface, said inner surface and said single curved face defining between them an air lens for correcting image distortions of said optical system.

2. The optical system as defined in claim 1, wherein said single curved face has an aspherical shape.

* * * * *